(12) United States Patent
Hamakita et al.

(10) Patent No.: US 8,459,402 B2
(45) Date of Patent: Jun. 11, 2013

(54) ELECTRIC POWER STEERING SYSTEM

(75) Inventors: Jun Hamakita, Kashihara (JP);
Hirotsugu Kusano, Kashihara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/283,916

(22) Filed: Oct. 28, 2011

(65) Prior Publication Data

US 2012/0111657 A1 May 10, 2012

(30) Foreign Application Priority Data

Nov. 9, 2010 (JP) ................................ 2010-251068

(51) Int. Cl.
*B62D 5/04* (2006.01)

(52) U.S. Cl.
USPC .......................................... 180/444; 180/443

(58) Field of Classification Search
USPC ............... 180/444, 443; 74/388 PS, 425, 427
See application file for complete search history.

(56) References Cited

U.S. PATENT DOCUMENTS

| | | | | |
|---|---|---|---|---|
| 6,599,021 B2 * | 7/2003 | Obara | ........................... | 384/493 |
| 7,568,550 B2 * | 8/2009 | Yasuda et al. | ................. | 180/444 |
| 8,066,093 B2 * | 11/2011 | Kondo et al. | ................. | 180/444 |
| 2005/0224278 A1 * | 10/2005 | Segawa | ......................... | 180/444 |
| 2006/0169528 A1 * | 8/2006 | Yuasa et al. | .................... | 180/444 |
| 2006/0175124 A1 * | 8/2006 | Saito et al. | ..................... | 180/444 |
| 2010/0126794 A1 * | 5/2010 | Shiino et al. | .................. | 180/444 |
| 2011/0147113 A1 * | 6/2011 | Ko et al. | ......................... | 180/444 |
| 2012/0061168 A1 * | 3/2012 | Hamakita et al. | ............. | 180/444 |

FOREIGN PATENT DOCUMENTS

| | | |
|---|---|---|
| EP | 1 571 067 A1 | 9/2005 |
| EP | 1 571 356 A1 | 9/2005 |
| EP | 1 623 908 A1 | 2/2006 |
| JP | A-2004-301265 | 10/2004 |

OTHER PUBLICATIONS

Feb. 17, 2012 Extended European Search Report issued in European Patent Application No. 11187772.6.

\* cited by examiner

*Primary Examiner* — Anne Marie M Boehler
(74) *Attorney, Agent, or Firm* — Oliff & Berridge, PLC

(57) ABSTRACT

A curvature radius of a raceway groove of an inner ring of a first bearing supporting a first end portion of a worm shaft and a curvature radius of a raceway groove of an outer ring of the first bearing are larger than 50% of a diameter of each rolling element of the first bearing, whereby the worm shaft is pivotable about the first end portion. Internal clearances in the first bearing are eliminated because the first bearing is pressed in a radial direction by a pressing member. When the worm shaft vibrates relative to a housing in an axial direction, paired second elastic members and damp and absorb the vibration.

10 Claims, 7 Drawing Sheets

ELECTRIC POWER STEERING SYSTEM

INCORPORATION BY REFERENCE

The disclosure of Japanese Patent Application No. 2010-251068 filed on Nov. 9, 2010 including the specification, drawings and abstract, is incorporated herein by reference in its entirety.

BACKGROUND OF THE INVENTION

1. Field of the Invention

The invention relates to an electric power steering system.

2. Discussion of the Related Art

In an electric power steering system in which an output from an electric motor is transmitted to a steering mechanism via a reduction mechanism, a worm reduction mechanism may be used as the reduction mechanism (for example, refer to paragraphs 0035, 0037, and 0038 of Japanese Patent Application Publication No. 2004-301265). A worm shaft of the worm reduction mechanism is connected to a rotation shaft of the electric motor. Both ends of the worm shaft are supported by a housing via bearings. Among these bearings, the bearing that supports one end portion of the worm shaft, to which the electric motor is connected, is a ball bearing. The inner ring of the ball bearing is allowed to oscillate relative to the outer ring. More specifically, the curvature radii of the raceway grooves of the inner and outer rings of the ball bearing are made large enough to allow the inner ring to oscillate relative to the outer ring. The other end portion of the worm shaft is urged toward the worm wheel side by an elastic member.

With the structure described above, the worm shaft is tilted about the one end portion toward the worm wheel side, thereby eliminating the backlash at a meshing portion where the worm shaft and the worm wheel mesh with each other. Further, when an axial load acting in the axial direction of the worm shaft is applied from the worm wheel to the worm shaft, the inner and outer rings of the ball bearing elastically deflect, allowing the worm shaft to slightly move in the axial direction. With this structure, the worm shaft is axially movable under a force transmitted from a steering wheel to the worm shaft via the worm wheel when the electric motor is not driven, for example, at the moment at which turning of the steering wheel is started. Accordingly, a resistive force that the worm shaft receives from the electric motor when the electric motor is not driven is smaller. As a result, it is possible to reduce a steering operation load that is placed on the driver when the electric motor is not driven.

Usually, there are internal clearances in a ball bearing. If the internal clearances are too large, when a worm shaft moves in the axial direction, an inner ring of the bearing moves in the axial direction together with the worm shaft. Then, balls of the bearing hit the inner and outer rings, and consequently contact noise is generated. On the other hand, if the internal clearances in the bearing are too small, the movement of the worm shaft is hindered excessively. More specifically, if the internal clearances in the bearing are too small, it is not possible to sufficiently move an end portion of the worm shaft, which is distant from a motor, toward a worm wheel. Thus, it is not possible to eliminate the backlash that is generated between the worm shaft and the worm wheel as the teeth of the worm shaft wear. Therefore, contact noise, due to the backlash, occurs when the worm shaft and the worm wheel hit each other.

Accordingly, the axial internal clearances in a ball bearing need to be set to appropriate values that are neither too large nor too small, and therefore strict dimensional control over the ball bearing is required. This results in an increase in the manufacturing cost. Japanese Patent Application Publication No. 2004-301265 describes that the internal clearances in a ball bearing are made "negative clearances" by press-fitting an inner ring onto a worm shaft such that the inner ring is pressed toward an outer ring. It is considered that, with this structure, it is considered that by setting the internal clearances in the bearing to be large when the bearing is not mounted on the worm shaft, an amount by which the worm shaft is allowed to move is made sufficiently large, while suppressing generation of the contact noise that would occur due to internal clearances when the balls and the inner and outer rings hit each other.

With the structure described in Japanese Patent Application Publication No. 2004-301265, however, it is necessary to accurately match the outer diameter of the worm shaft, which is an elongated shaft, with the inner diameter of the inner ring of the ball bearing to allow the worm shaft to press the inner ring in the radial direction by an appropriate amount. That is, it is necessary to execute considerably strict dimensional control to achieve an appropriate fitting-interference between the worm shaft and the inner ring of the ball bearing. Therefore, a lot of time and efforts are required to fit the inner ring of the ball bearing onto the worm shaft.

In the structure described in Japanese Patent Application Publication No. 2004-301265, because the axial movement of the worm shaft is allowed using the deflection of the steel inner and outer rings of the ball bearing, the amount by which the worm shaft is allowed to move in the axial direction is considerably small. For this reason, the worm shaft is able to move by only a small amount in the axial direction when an axial load is applied from a steering operation member to the worm shaft via the worm wheel, and therefore a resistive force from the electric motor when it is not driven cannot be sufficiently reduced. As a result, a large reaction force acts on the steering operation member via the worm shaft and the worm wheel, and thus the steering operation load placed on the driver cannot be sufficiently reduced.

SUMMARY OF THE INVENTION

It is an object of the invention to provide an electric power steering system that has a low noise level, is inexpensive, and is assembled with less effort, and that is able to sufficiently reduce a steering operation load placed on a driver.

An aspect of the invention relates to an electric power steering system. The electric power steering system includes: a worm shaft that has a first end portion and a second end portion, and that is connected to an electric motor; a worm wheel that meshes with the worm shaft, and that is connected to a steering mechanism; a housing that houses the worm shaft and the worm wheel; a first bearing that rotatably supports the first end portion, and that has an inner ring having a raceway groove, an outer ring having a raceway groove, and rolling elements interposed between the raceway grooves, wherein curvature radii of the raceway grooves in the first bearing are each larger than 50% of a diameter of each of the rolling elements, whereby the worm shaft is allowed to pivot about the first end portion, and the first bearing is opposed, in an axial direction of the worm shaft, to an opposed portion provided at the housing or the worm shaft and is movable relative to the opposed portion in the axial direction; a second bearing that rotatably supports the second end portion; a first elastic member that elastically urges the second bearing in a direction in which an inter-axis distance between a central axis of the worm shaft and a central axis of the worm wheel decreases; an annular pressing member that is fitted to the first bearing and radially presses the first bearing to cause the raceway groove of the inner ring, the raceway groove of the outer ring, and the rolling elements to press against each other; and a second elastic member that is arranged between the opposed portion and the first bearing and elastically deforms as the worm shaft moves relative to the housing in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
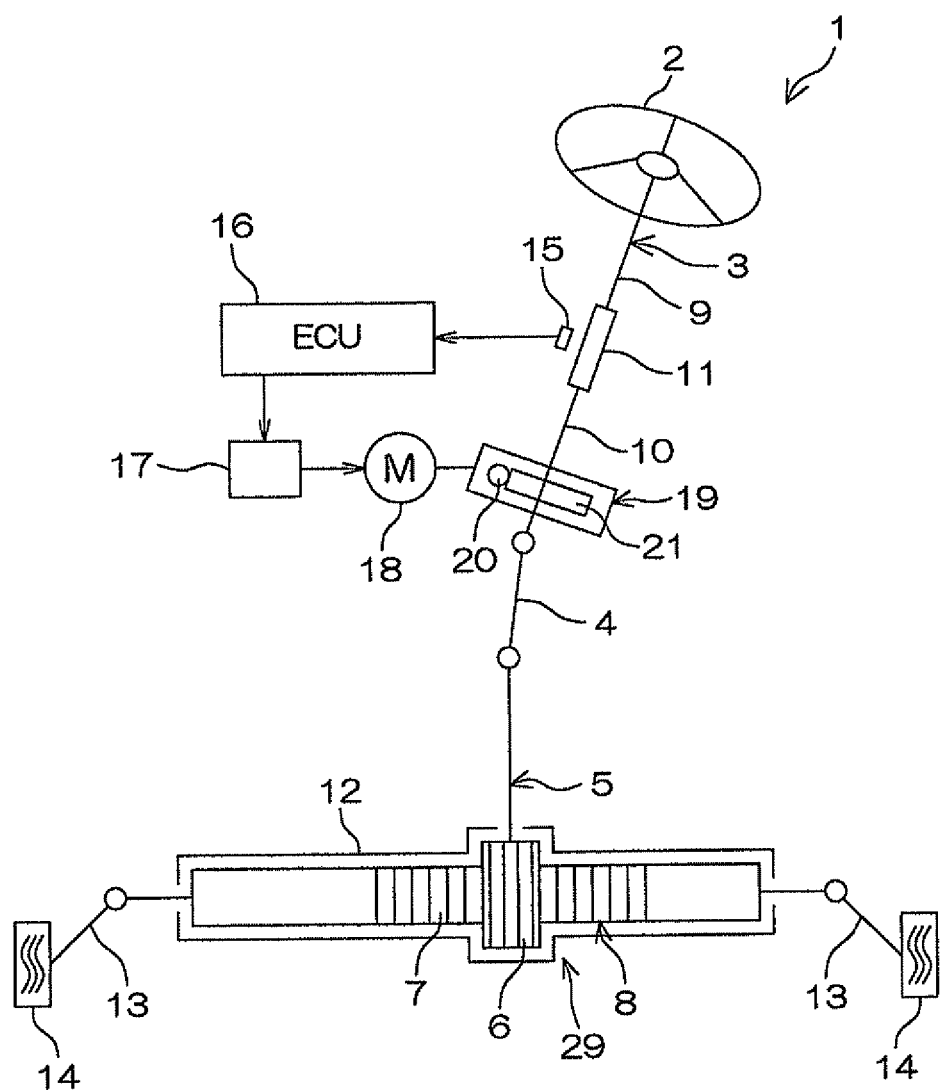
FIG. 1 is a view schematically illustrating the configuration of an electric power steering system according to an example embodiment of the invention.

Hereafter, example embodiments of the invention will be described in detail with reference to the accompanying drawings. FIG. 1 is a view schematically illustrating the configuration of an electric power steering system 1 according to an example embodiment of the invention. Referring to FIG. 1, the electric power steering system 1 includes a steering shaft 3, a pinion shaft 5, a rack 7, and a rack shaft 8. The steering shaft 3 is connected to a steering operation member 2, which is a steering wheel, for example. The pinion shaft 5 is connected to the steering shaft 3 via an intermediate shaft 4. The rack 7 is in mesh with a pinion 6 provided at the pinion shaft 5. The rack shaft 8 is a steered shaft that extends in the lateral direction of a vehicle. The pinion shaft 5 and the rack shaft 8 constitute a steering mechanism 29 that is formed of a rack-and-pinion mechanism.

The steering shaft 3 includes an input shaft 9 connected to the steering operation member 2, and an output shaft 10 connected to the intermediate shaft 4. The input shaft 9 and the output shaft 10 are coaxially connected to each other via a torsion bar 11 so as to be rotatable relative to each other. The rack shaft 8 is supported by a housing 12 via multiple bearings (not shown in the drawings) so as to be linearly movable back and forth. The both ends of the rack shaft 8 protrude out of the housing 12. The ends of the rack shaft 8 are linked, respectively, to steered wheels 14 via tie rods 13 and knuckle arms (not shown in the drawings).

As a driver turns the steering operation member 2, the steering shaft 3 rotates. The rotation of the steering shaft 3 is converted into a linear reciprocating motion of the rack shaft 8 via the pinion 6 and the rack 7. Thus, the steered wheels 14 are steered. As the steering torque is input into the steering operation member 2, the torsion bar 11 is twisted, which causes the input shaft 9 and the output shaft 10 to rotate relative to each other by a minute angle. A displacement due to the relative rotation is detected by a torque sensor 15 provided near the steering shaft 3. Thus, the torque acting on the steering operation member 2 is detected. The output signals from the torque sensor 15 are input into an ECU 16 (Electronic Control Unit). The ECU 16 controls the driving of a steering operation assist electric motor 18 via a drive circuit 17 based on the value of the torque, the value of the vehicle speed detected by a vehicle speed sensor (not shown in the drawings), etc.

The output from the electric motor 18 is transmitted to the output shaft 10 of the steering shaft 3 via a reduction unit 19. The force transmitted to the output shaft 10 is transmitted to the rack shaft 8 via the pinion shaft 5, etc., whereby the steering operation is assisted. The reduction unit 19 includes a worm shaft 20 and a worm wheel 21. The worm shaft 20 is a drive gear that is rotationally driven by the electric motor 18. The worm wheel 21 is a driven gear that is in mesh with the worm shaft 20. The worm wheel 21 is connected to the steering mechanism 29 via the output shaft 10 of the steering shaft 3, etc.

Figure 2:
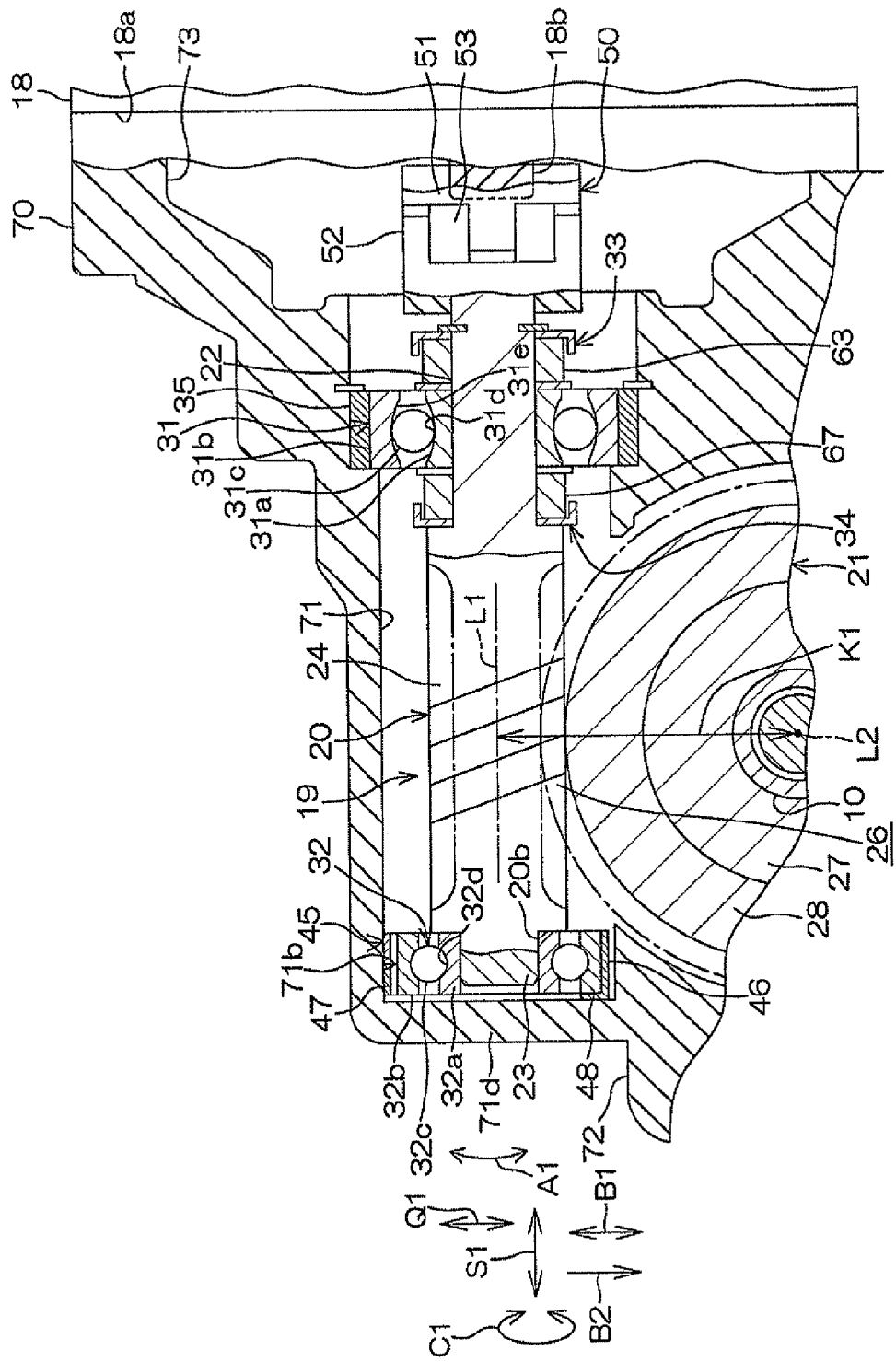
FIG. 2 is a sectional view showing an electric motor and a reduction unit, and the structures near the reduction unit.

FIG. 2 is a sectional view showing the electric motor 18, the reduction unit 19, and the structures near the reduction unit 19. Referring to FIG. 2, the reduction unit 19 is housed in a housing 70. The electric motor 18 is supported by the housing 70. The housing 70 has a drive gear housing portion 71 and a driven gear housing portion 72, which are both cylindrical. The worm shaft 20 is housed in the drive gear housing portion 71. The worm wheel 21 is housed in the driven gear housing portion 72. The drive gear housing portion 71 and the driven gear housing portion 72 are formed as a single-piece member that is made of a metallic material, such as an aluminum alloy.

An annular flange portion 73 is formed at an end of the drive gear housing portion 71. The annular flange portion 73 is formed integrally with the drive gear housing portion 71. A motor housing 18a of the electric motor 18 is attached to the annular flange portion 73 with fastening screws (not shown in the drawings). The electric motor 18 has the motor housing 18a and an output shaft 18b rotatably supported by the motor housing 18a. The output shaft 18b protrudes from the motor housing 18a toward the drive gear housing portion 71. The output shaft 18b is connected to the worm shaft 20 via a joint 50 such that drive force is transmittable between the output shaft 18b and the worm shaft 20.

The worm shaft 20 has a first end portion 22, a second end portion 23, and a columnar worm 24 provided between the first end portion 22 and the second end portion 23 and having gear teeth. The first end portion 22 is connected to the output shaft 18b of the electric motor 18 via the joint 50 such that drive force is transmittable between the first end portion 22 and the output shaft 18b of the electric motor 18. Thus, the output from the electric motor 18 is transmitted to the worm shaft 20. The worm wheel 21 has an annular metallic core 27 and a synthetic-resin member 28. The metallic core 27 is fixed on the output shaft 10 so as to be rotatable together with the output shaft 10. The synthetic-resin member 28 surrounds the metallic core 27, and teeth are formed in the outer periphery of the synthetic-resin member 28. The metallic core 27 is inserted into a mold, for example, when resin molding is performed to form the synthetic-resin member 28. The metallic core 27 is connected to the output shaft 10 of the steering shaft 3, for example, through press-fitting. Thus, the worm wheel 21 is rotatable together with the output shaft 10 but axially immovable relative to the output shaft 10.

A first bearing 31 is provided at the first end portion 22 of the worm shaft 20. A second bearing 32 is provided at the second end portion 23 of the worm shaft 20. The first bearing 31 and the second bearing 32 are, for example, rolling bearings such as deep groove ball bearings. The worm shaft 20 is rotatably supported by the drive gear housing portion 71 of the housing 70 via the first bearing 31 and the second bearing 32.

The worm shaft 20 is pivotable about the first bearing 31 in a pivoting direction A1. The second end portion 23 of the worm shaft 20 is elastically urged in an urging direction 132, which is a direction in which a distance (inter-axis distance) K1 between a central axis L1 of the worm shaft 20 and a central axis L2 of the worm wheel 21 decreases. This suppresses generation of backlash in a meshing region 26 where the worm 24, serving as the gear teeth portion of the worm shaft 20, and the worm wheel 21 mesh with each other. In the electric power steering system 1, the internal clearances in the first bearing 31 that supports the worm shaft 20 are eliminated. This suppresses generation of rattle (vibrations) in the first bearing 31. The internal clearances in the first bearing 31 are, for example, the radial clearances between rolling elements 31c and an inner ring 31a and the radial clearances between rolling elements 31c and an outer ring 31b.

Further, the worm shaft 20 is movable relative to the housing 70 in an axial direction S1. This reduces a reaction force that is transferred from the electric motor 18 to the worm shaft 20 during a period from when an operation of the steering operation member 2 is started until when driving of the electric motor 18 is started. In the following, the axial direction S1, radial direction Q1, and circumferential direction C1 of the worm shaft 20 will be simply referred to as "the axial direction S1", "the radial direction Q1", and "the circumferential direction C1", respectively.

Figure 3:
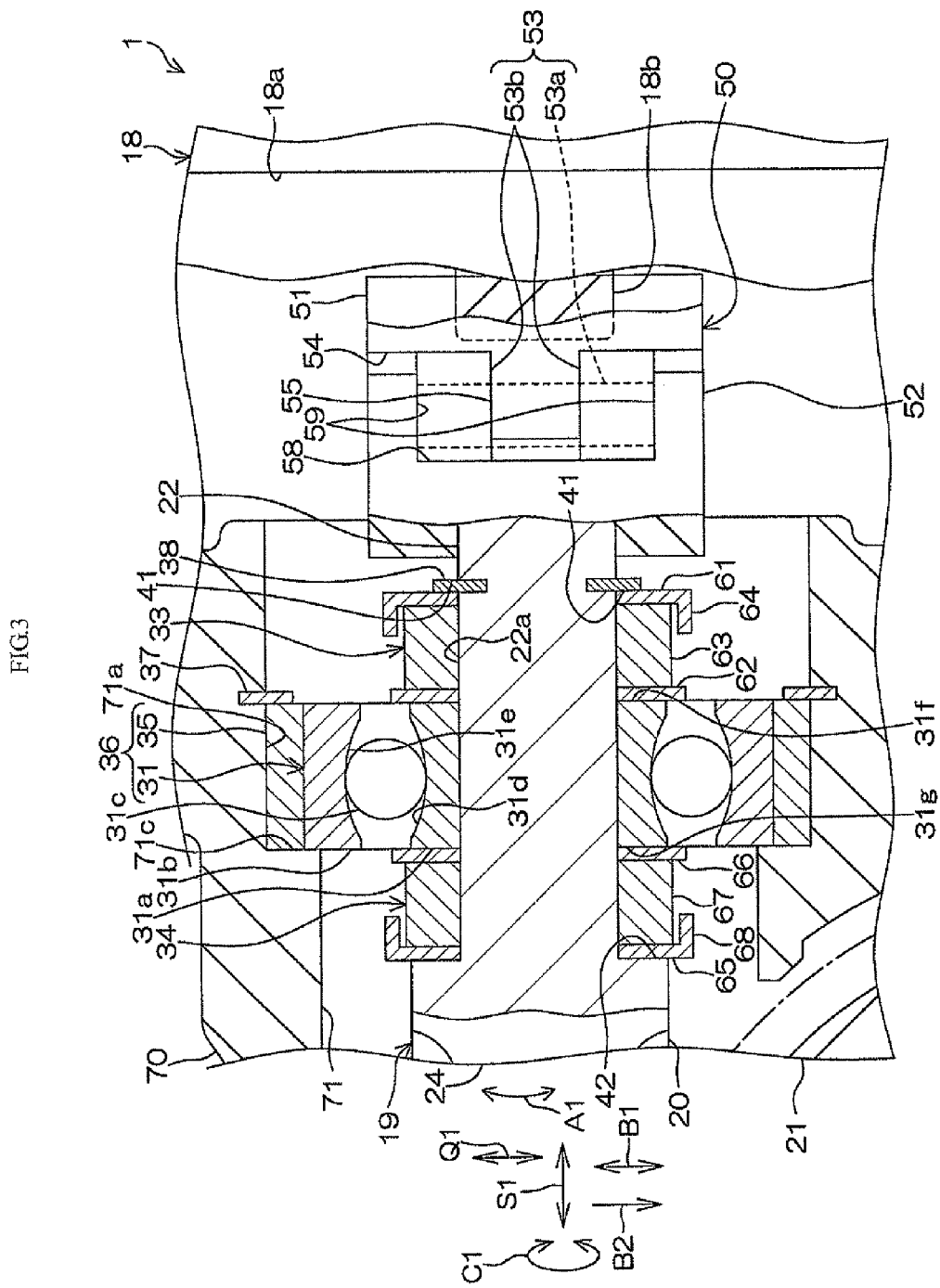
FIG. 3 is an enlarged view of portions near a first bearing shown in FIG. 2.

FIG. 3 is an enlarged view of portions near the first bearing 31 shown in FIG. 2. Referring to FIG. 3, the first bearing 31 supports the first end portion 22 of the worm shaft 20 such that the worm shaft 20 is pivotable about the first bearing 31 in the pivoting direction A1. The first bearing 31 has the inner ring 31a, the outer ring 31b, and the rolling elements (balls) 31c. The inner ring 31a of the first bearing 31 is fitted onto an outer periphery 22a of the first end portion 22. The inner ring 31a is fitted onto the first end portion 22 through clearance fit, or the like, and is therefore movable relative to the worm shaft 20 in the axial direction S1. Two second elastic member units 33 and 34 are provided on the respective sides of the inner ring 31a of the first bearing 31.

The outer ring 31b of the first bearing 31 is supported by a first bearing support portion (retention hole) 71a via a pressing member 35 press-fitted and thereby fixed onto the outer peripheral face of the outer ring 31b. The first bearing support portion 71a is formed in the inner peripheral face of the drive gear housing portion 71. The pressing member 35 is a cylindrical collar made of metal (e.g., iron) and surrounding the first bearing 31. The pressing member 35 and the first bearing 31 are assembled into a sub-assembly 36. During assembly of the electric power steering system 1, the first bearing 31 prepared as the sub-assembly 36 is fitted onto the first end portion 22 of the worm shaft 20.

The pressing member 35 is fitted to the first bearing support portion 71a through clearance fit, or the like. Therefore, the pressing member 35 and the first bearing 31 are not subjected to any pressing force applied from the first bearing support portion 71a in the radial direction Q1. The drive gear housing portion 71 has an annular stepped portion 71c and a first snap ring 37 that are located on respective sides of the first bearing support portion 71a in the axial direction S1. The first snap ring 37 is fixed in an annular grove formed in the inner peripheral face of the drive gear housing portion 71. The outer ring 31b of the first bearing 31 and the pressing member 35 are interposed, in the axial direction S1, between the annular stepped portion 71c and the first snap ring 37. Thus, movement of the outer ring 31b of the first bearing 31 and the pressing member 35 relative to the drive gear housing portion 71 in the axial direction S1 is restricted.

Figure 4:
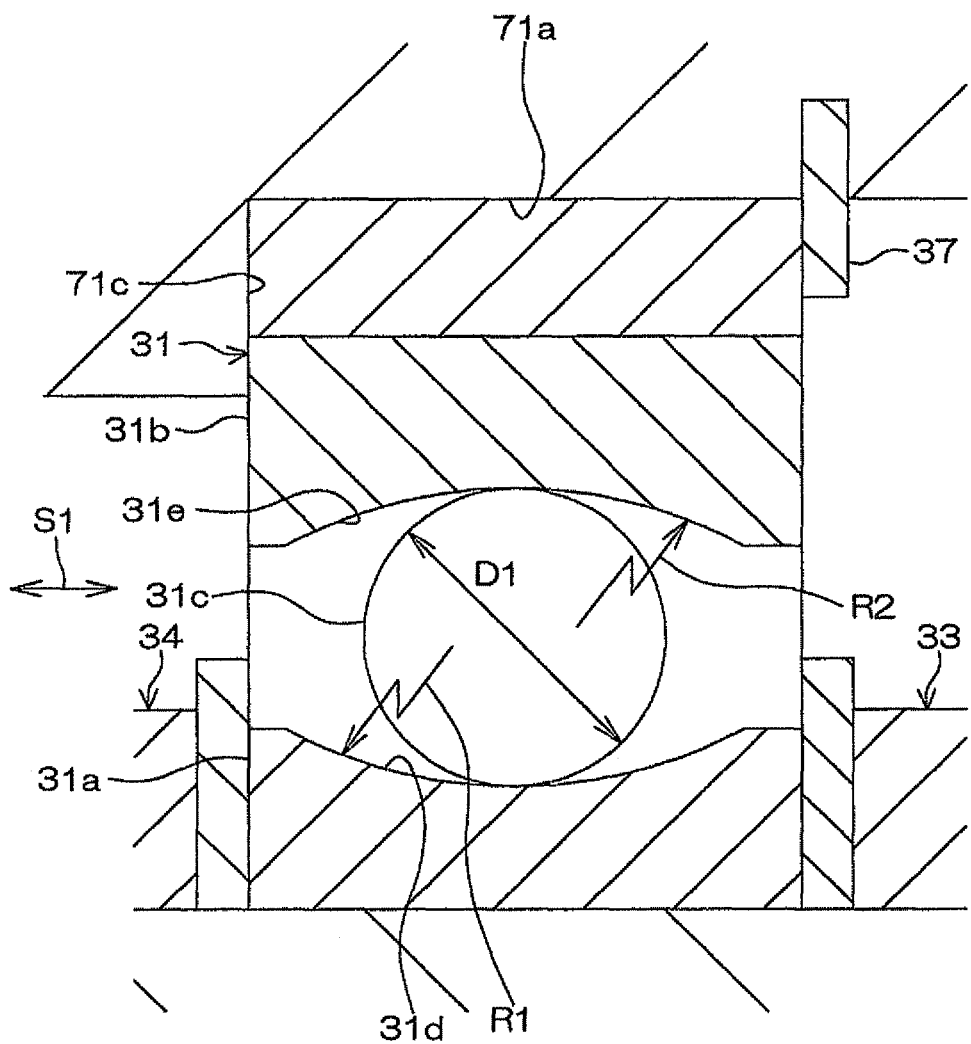
FIG. 4 is a further enlarged view of the portions near the first bearing shown in FIG. 3.

FIG. 4 is a further enlarged view of the portions near the first bearing 31 shown in FIG. 3. Referring to FIG. 4, the rolling elements 31c of the first bearing 31 are interposed between a raceway groove 31d formed at the outer peripheral face of the inner ring 31a and a raceway groove 31e formed at the inner peripheral face of the outer ring 31b. Each rolling element 31c of the first bearing 31 is a ball having a predetermined diameter D1. A curvature radius R1 of the raceway groove 31d of the inner ring 31a of the first bearing 31 and a curvature radius R2 of the raceway groove 31e of the outer ring 31b of the first bearing 31 are both larger than 50% of the diameter D1 of each rolling element 31c, in a cutting plane that includes the center of the rolling element 31c and the central axis of the first bearing 31 (i.e., cutting plane shown in FIG. 4).

Preferably, the ratio of the curvature radius R1 of the raceway groove 31d of the inner ring 31a to the diameter D1 of the rolling element 31c (R1/D1) is larger than the ratio of the inner ring raceway groove curvature radius R10 to the rolling element diameter D10 (R10/D10, e.g., 51%), which is specified for standard bearings in JIS (Japanese Industrial Standards), etc. Preferably, the curvature radius R1 of the raceway groove 31d of the inner ring 31a is set to 52% to 56% of the diameter D1 of the rolling element 31c ($0.52D1 \leq R1 \leq 0.56D1$). If the curvature radius R1 is less than 52% of the diameter D1 ($R1 < 0.52D1$), an amount by which the inner ring 31a is allowed, through rotational movement with respect to the rolling elements 31c, to oscillate relative to the outer ring 31b may be insufficient. Further, if the curvature radius R1 is larger than 56% of the diameter D1 ($0.56D1 < R1$), the depth of the raceway groove 31d of the inner ring 31a is too small to securely hold the rolling elements 31c. This may increase the possibility that the rolling elements 31c will come out of the raceway groove 31d of the inner ring 31a. More preferably, the curvature radius R1 is 52.5% of the diameter D1 or larger. Further, the curvature radius R1 may be 75% of the diameter D1 or smaller.

Preferably, the ratio of the curvature radius R2 of the raceway groove 31e of the outer ring 31b to the diameter D1 of the rolling element 31e (R2/D1) is larger than the ratio of the outer ring raceway groove curvature radius R20 to the rolling element diameter D10 (R20/D10, e.g., 53%), which is specified for standard bearings in JIS (Japanese Industrial Standards), etc. Preferably, the curvature radius R2 of the raceway groove 31e of the outer ring 31b is set to 54% to 58% of the diameter D1 of the rolling element 31c ($0.54D1 \leq R2 \leq 0.58D1$). If the curvature radius R2 is smaller than 54% of the diameter D1 ($R2 < 0.54D1$), an amount by which the outer ring 31b is allowed, through rotational movement with respect to the rolling elements 31c, to oscillate relative to the inner ring 31a may be insufficient. Further, if the curvature radius R2 is larger than 58% of the diameter D1 ($0.58D1 < R2$), the depth of the raceway groove 31e of the outer ring 31b is too small to securely hold the rolling elements 31c. This may increase the possibility that the rolling elements 31c will come out of the raceway groove 31e of the outer ring 31b. More preferably, the curvature radius R2 is 53.5% of the diameter D1 or larger. Further, the curvature radius R2 may be 85% of the diameter D1 or smaller.

Further, preferably, the curvature radius R2 of the raceway groove 31e of the outer ring 31b is larger than the curvature radius R1 of the raceway groove 31d of the inner ring 31a (R1<R2). Thus, the inner ring 31a is able to more smoothly oscillate relative to the outer ring 31b as the worm shaft 20 pivots. Referring to FIG. 3, due to the structure described above, the inner ring 31a of the first bearing 31 is allowed to oscillate relative to the outer ring 31b by a large amount in the pivoting direction A1. The pivoting direction A1 of the worm shaft 20 includes both the clockwise and counterclockwise directions about the first bearing 31 on a plane perpendicular to the central axis L2 of the worm wheel 21.

The inner diameter of the pressing member 35 (i.e., the diameter measured at the inner peripheral face of the pressing member 35) is smaller than the outer diameter of the outer ring 31b of the first bearing 31 when the pressing member 35 is not fixed onto the first bearing 31. Thus, when fixed on the outer ring 31b of the first bearing 31, the pressing member 35 elastically presses the outer ring 31b inward in the radial direction Q1. Thus, in the first bearing 31, the raceway groove 31e of the outer ring 31b, the rolling elements 31c, and the raceway groove 31d of the inner ring 31a elastically press against each other in the radial direction Q1. Thus, the internal clearances in the first bearing 31 are eliminated, more specifically, "negative clearances" are created.

The first bearing 31 is arranged, in the axial direction S1, between a pair of opposed portions 41 and 42 provided on the worm shaft 20. The opposed portion 41 is provided at a second snap ring 38 fixed in an annular groove at the first end portion 22 of the worm shaft 20. More specifically, the opposed portion 41 is annular and provided at one side face of the second snap ring 38. On the other hand, the opposed portion 42 is annular and provided at an annular stepped portion formed between the first end portion 22 and worm 24 of the worm shaft 20.

In the axial direction S1, the second elastic member units 33 and 34 are located between the opposed portions 41 and 42 and arranged on respective sides of the first bearing 31. More specifically, the second elastic member unit 33 is arranged between the inner ring 31a of the first bearing 31 and the opposed portion 41. Also, the second elastic member unit 34 is arranged between the inner ring 31a of the first bearing 31 and the opposed portion 42.

The second elastic member units 33 and 34 are provided to allow the worm shaft 20 to elastically move relative to the housing 70 in the axial direction S1. Further, the second elastic member units 33 and 34 also serve to damp and absorb the vibration of the worm 24 when vibrating force is input into the worm shaft 20 in the axial direction S1. The second elastic member unit 33 has a pair of side plates 61 and 62 arranged in the axial direction S1 and a second elastic member 63 interposed between the two side plates 61 and 62. The side plates 61 and 62 are each made from a metallic plate.

The side plate 61 is annular, and is received by the opposed portion 41. A stopper portion 64 that extends toward the side plate 62 is formed at the side plate 61. The side plate 62 is annular, and is abutted on and thus received by a side face 31f, located on one side, of the inner ring 31a of the first bearing 31. The second elastic member 63 is made of an elastic material (e.g., rubber) and is annular. The second elastic member 63 is joined to the side plate 61 by cure adhesion, for example. Further, the second elastic member 63 is joined also to the side plate 62 by cure adhesion, for example. The second elastic member 63 is arranged between the opposed portion 41 and the first bearing 31.

With the structure described above, the stopper portion 64 contacts the side plate 62, when the second elastic member 63 is compressed up to a certain degree. Thus, excessive compression of the elastic member 63 is prevented. The second elastic member unit 34 has a pair of side plates 65 and 66 arranged in the axial direction S1 and a second elastic member 67 interposed between the two side plates 65 and 66. The side plates 65 and 66 are each made from a metallic plate.

The side plate 65 is annular, and is received by the opposed portion 42. A stopper portion 68 that extends toward the side plate 66 is formed at the side plate 65. The side plate 66 is annular, and is abutted on and thus received by a side face 31g, located on the other side, of the inner ring 31a of the first bearing 31. The second elastic member 67 is made of the same material as the second elastic member 63 and is annular. The second elastic member 67 is joined to the side plate 65 by cure adhesion, for example. Further, the second elastic member 67 is joined also to the side plate 66 by cure adhesion, for example. The second elastic member 67 is arranged between the opposed portion 42 and the first bearing 31.

With the structure described above, the stopper portion 68 contacts the side plate 66, when the second elastic member 67 is compressed up to a certain degree. Thus, excessive compression of the second elastic member 67 is prevented. As such, the elastic members 63 and 67 are elastically compressed when the electric power steering system 1 structured as described above is in an initial operation state. When the worm shaft 20 vibrates relative to the housing 70 in the axial direction S1, the elastic members 63 and 67 elastically deform to damp and absorb the vibration.

Referring to FIG. 2, the second bearing 32 has an inner ring 32a, an outer ring 32b, and rolling elements 32c. The inner ring 32a of the second bearing 32 is fitted onto the outer periphery of the second end portion 23. One end face of the inner ring 32a is received by an annular stepped portion 20b formed between the second end portion 23 and the worm 24. The outer ring 32b of the second bearing 32 is supported, via a first elastic member 45, on a second bearing support portion 71b formed in the inner peripheral face of the drive gear housing portion 71. The second bearing support portion 71b is a long hole that is long in an opposing direction B1 shown in FIG. 2. Thus, the second bearing 32 and the second end portion 23 are movable relative to the drive gear housing portion 71 in the opposing direction B1 in which the central axis L1 of the worm shaft 20 and the central axis L2 of the worm wheel 21 are opposed to each other.

The first elastic member 45 is a leaf spring that is manufactured by pressing an elongated metal piece. The first elastic member 45 has an arc-shaped body 46 and an elastic tongue 47 that extends from the body 46. The body 46 is fitted onto the outer peripheral face of the outer ring 32b of the second bearing 32. The elastic tongue 47 is in contact with the second bearing support portion 71b and elastically compressed. This elastic compression produces an elastic reactive force with which the first elastic member 45 urges, via the second bearing 32, the second end portion 23 of the worm shaft 20 in the urging direction B2 that is one of the two directions along the opposing direction B1.

The urging direction B2 is perpendicular to the central axis L1 of the worm shaft 20 and extends from the worm shaft 20 toward the worm wheel 21 (i.e., the direction in which the inter-axis distance K1 decreases) when the reduction unit 19 is viewed along the axial direction of the worm wheel 21. Multiple elastic projections 48 are formed at the body 46. The elastic projections 48 each extend radially inward from the body 46. The elastic projections 48 are received by an end wall 71d of the drive gear housing portion 71, and elastically urge the second bearing 32 toward the first bearing 31.

As described above, the second bearing 32 is supported by the second bearing support portion 71b via the first elastic member 45 such that the second bearing 32 is allowed to be displaced in the direction in which the inter-axis distance K1 between the central axis of the worm shaft 20 and that of the worm wheel 21 increases and decreases (i.e., the opposing direction B1). Further, the worm shaft 20 is elastically urged, with respect to the first bearing 31 (the first end portion 22) as the pivot center, so as to reduce the inter-axis distance K1 between the central axis of the worm shaft 20 and that of the worm wheel 21. In this way, backlash between the worm 24 of the worm shaft 20 and the worm wheel 21 is kept zero.

Referring to FIG. 3, the joint 50 interconnects the worm shaft 20 and the output shaft 18b of the electric motor 18 such that drive force is transmittable between them while the worm shaft 20 is pivotable in the pivoting direction A1, that is, the worm shaft 20 is pivotable about the first bearing 31. The joint 50 includes a first coupling member 51, a second coupling member 52, and an elastic member 53. The first coupling member 51 is connected to the output shaft 18b of the electric motor 18 such that the first coupling member 51 is rotatable together with the output shaft 18b. The second coupling member 52 is connected to the first end portion 22 of the worm shaft 20 such that the second coupling member 52 is rotatable together with the first end portion 22 of the worm shaft 20. The elastic member 53 is interposed between the first coupling member 51 and the second coupling member 52, and transmits torque from the first coupling member 51 to the second coupling member 52.

The first coupling member 51 has a first body 54 and a plurality of first coupling projections 55 (note that only one of the first coupling projections 55 is shown in FIG. 3). The first body 54 is secured to the output shaft 18b of the electric motor 18. The first coupling projections 55 project from the first body 54 toward the second coupling member 52. The first coupling projections 55 are equiangularly arranged along the circumference of the first body 54. The second coupling member 52 has a second body 58 and a plurality of second coupling projections 59. The second body 58 is secured to the first end portion 22 of the worm shaft 20. The second coupling projections 59 project from the second body 58 toward the first coupling member 51. The second coupling projections 59 are equiangularly arranged along the circumference of the second body 58. Thus, the first coupling projections 55 and the second coupling projections 59 are alternately arranged in the circumferential direction C1.

The elastic member 53 is made of, for example, synthetic rubber or synthetic resin. The elastic member 53 has an annular third body 53a and a plurality of coupling arms 53b. The coupling arms 53b radially extend from the peripheral face of the third body 53a. The coupling arms 53b are each arranged between a corresponding one of the first coupling projections 55 and the second coupling projection 59 that is opposed, in the circumferential direction C1, to the same first coupling projection 55, thus preventing contacts between the first coupling projections 55 and the second coupling projections 59.

As the worm shaft 20 pivots in the pivoting direction A1, the second coupling member 52 is moved so as to be tilted relative to the first coupling member 51 while elastically deforming the elastic member 53. As such, the joint 50 interconnects the output shaft 18b of the electric motor 18 and the first end portion 22 of the worm shaft 20 such that torque is transmittable between them and such that the worm shaft 20 is pivotable in the pivoting direction A1. According to this example embodiment, as described above, the curvature radius R1 of the raceway groove 31d and the curvature radius R2 of the raceway groove 31e in the first bearing 31 are set to be larger than 50% of the diameter D1 of each rolling element 31c to allow the worm shaft 20 to pivot about the first end portion 22. Thus, the worm shaft 20 is allowed to pivot about the first bearing 31 by a sufficiently large amount. Therefore, even if wear occurs in the meshing region 26 where the worm shaft 20 and the worm wheel 21 mesh with each other, the worm shaft 20, urged by the first elastic member 45, is able to sufficiently pivot. Thus, it is possible to maintain the state where backlash between the worm shaft 20 and the worm wheel 21 is eliminated. In this way, it is possible to suppress occurrence of rattle (vibrations) between the worm shaft 20 and the worm wheel 21 for a long period of time. Thus, even if a reactive force is transmitted to the meshing region 26, in which the worm shaft 20 and the worm wheel 21 mesh with each other, from the road surface via the steering mechanism 29, and so on, when the vehicle is traveling on a rough road, or the like, the vibration of the worm wheel against the worm shaft, which may be caused by the reactive force, can be suppressed. Therefore, it is possible to suppress generation of rattling noise (rattling gear-contact noise) in the meshing region in which the worm shaft and the worm wheel mesh with each other. In addition, since the second elastic members 63 and 67 damp and absorb the vibration of the worm shaft 20, the rattling gear-contact noise is more reliably reduced.

Further, the first bearing 31 is movable in the axial direction S1 relative to the two opposed portions 41 and 42 of the worm shaft 20. This allows the worm shaft 20 to move in the axial direction S1 by a sufficiently large amount. Therefore, the worm shaft 20 can sufficiently move in the axial direction S1 when an axial load acts on the worm shaft 20 as the steering shaft 3 and the worm wheel 21 are rotated by an operation of the steering operation member 2 by the driver. Accordingly, when the electric motor 18 is not driven, for example, because the operation amount of the steering operation member 2 is very small, application of the reaction force from the electric motor 18 to the worm shaft 20 is suppressed. Therefore, the reaction force transferred to the steering operation member 2 via the worm shaft 20, the worm wheel 21, and the steering shaft 3 is small. Thus, a steering operation load imposed on the driver is sufficiently reduced. Further, the curvature radius R1 of the raceway groove 31d and the curvature radius R2 of the raceway groove 31e are made large to reduce the loads placed on the outer ring 31b due to oscillation of the inner ring 31a, which makes it easier for the worm shaft 20 to move. Thus, the steering operation load placed on the driver is further reduced.

Further, negative internal clearances are created in the first bearing 31 (i.e., the internal clearances are eliminated in the first bearing 31) by, using the pressing member 35, pressing the inner ring 31a, the outer ring 31b, and the rolling elements 31c of the first bearing 31 in the radial direction Q1. This prevents the contact noise that would occur when the rolling elements 31c hit the raceway grooves 31d and 31e if the first bearing 31 had internal clearances therein, that is, the rattling noise (bearing rattling noise) that would occur due to rattle in the first bearing 31. Further, the pressing member 35 does not hinder the oscillation of the inner ring 31a of the first bearing 31 relative to the outer ring 31b, unlike the case where the internal clearances are eliminated by pressing the first bearing 31 in the axial direction S1. Further, the first bearing 31 can be fitted onto the worm shaft 20 just by attaching the sub-assembly 36, which is assembled in advance by attaching the pressing member 35 on the first bearing 31, onto the worm shaft 20.

That is, it is not necessary to perform highly accurate dimensional matching between the inner diameter of the inner ring 31a of the first bearing 31 and the outer diameter of the worm shaft 20 and then press-fit the inner ring 31a of the first bearing 31 onto the worm shaft 20 so as to adjust the internal clearances in the first bearing 31 to appropriate values, which requires a lot of time and efforts. Therefore, the time, efforts, and cost required to assemble the electric power steering system 1 can be reduced. Further, using a ball bearing as the first bearing 31 allows the worm shaft 20 to pivot about the first bearing 31 more reliably.

Further, the first bearing 31 and the pressing member 35 can be easily fitted onto the worm shaft 20 just by fitting the sub-assembly 36, which is assembled by press-fitting the pressing member 35 onto the outer ring 31b of the first bearing 31, to the first end portion 22 of the worm shaft 20. Further, the pressing member 35 is fitted in the first bearing support portion 71a of the housing 70 through clearance fit. With this structure, the internal clearance state in the first bearing 31 does not change when the pressing member 35 and the first bearing 31 are together set in the first bearing support portion 71a, unlike the case where the first bearing support portion 71a is a press-fit hole and the pressing member 35 and the first bearing 31 are press-fit into the press-fit hole.

Further, the second elastic members 63 and 67, which are provided on the respective sides of the first bearing 31, reliably damp and absorb the vibration of the worm shaft 20 in the axial direction S1. For example, when the vehicle is traveling on a very uneven rough road, or the like, if force (reactive force) is input from the road surface to the steered wheels 14, the steering mechanism 29, and the worm wheel 21, the reactive force acts as a force which causes the worm wheel 21 in mesh with the worm shaft 20 to vibrate at a high frequency in the circumferential direction of the worm wheel 21. Further, this force may cause the worm shaft 20 to vibrate in the axial direction S1. With the structure described above, however, even when the worm shaft 20 thus vibrates in the axial direction S1, the second elastic members 63 and 67, which are provided on the respective sides of the first bearing 31, reliably damp and absorb the vibration of the worm shaft 20.

Further, setting the curvature radius R1 of the raceway groove 31d of the inner ring 31a of the first bearing 31 to at least 52% of the diameter D1 of each rolling element 31c allows the inner ring 31a to oscillate, through rotational movement of the inner ring 31a with respect to the rolling elements 31c, relative to the outer ring 31b by a sufficient amount. Further, setting the curvature radius R1 of the raceway groove 31d of the inner ring 31a of the first bearing 31 to at most 56% of the diameter D1 of each rolling element 31c achieves a sufficiently large depth of the raceway groove 31d of the inner ring 31a, which enables the rolling elements 31c to be securely held by the inner ring 31a. Thus, the possibility that the rolling elements 31c will come out of the raceway groove 31d of the inner ring 31a is reliably reduced. As a result, the loads on the rolling elements 31c and the raceway groove 31d of the inner ring 31a are reduced, resulting in a longer life of the first bearing 31.

Further, setting the curvature radius R2 of the raceway groove 31e of the outer ring 31b of the first bearing 31 to at least 54% of the diameter D1 of each rolling element 31c allows the outer ring 31b to oscillate, through rotational movement of the outer ring 31b with respect to the rolling elements 31c, relative to the inner ring 31a by a sufficient amount. Further, setting the curvature radius R2 of the raceway groove 31e of the outer ring 31b of the first bearing 31 to at most 58% of the diameter D1 of each rolling element 31c achieves a sufficiently large depth of the raceway groove 31e of the outer ring 31b, which enables the rolling elements 31c to be securely held by the outer ring 31b. Thus, the possibility that the rolling elements 31c will come out of the raceway groove 31e of the outer ring 31b is reliably reduced. As a result, the loads on the rolling elements 31c and the raceway groove 31e of the outer ring 31b are reduced, resulting in a longer life of the first bearing 31.

Figure 5:
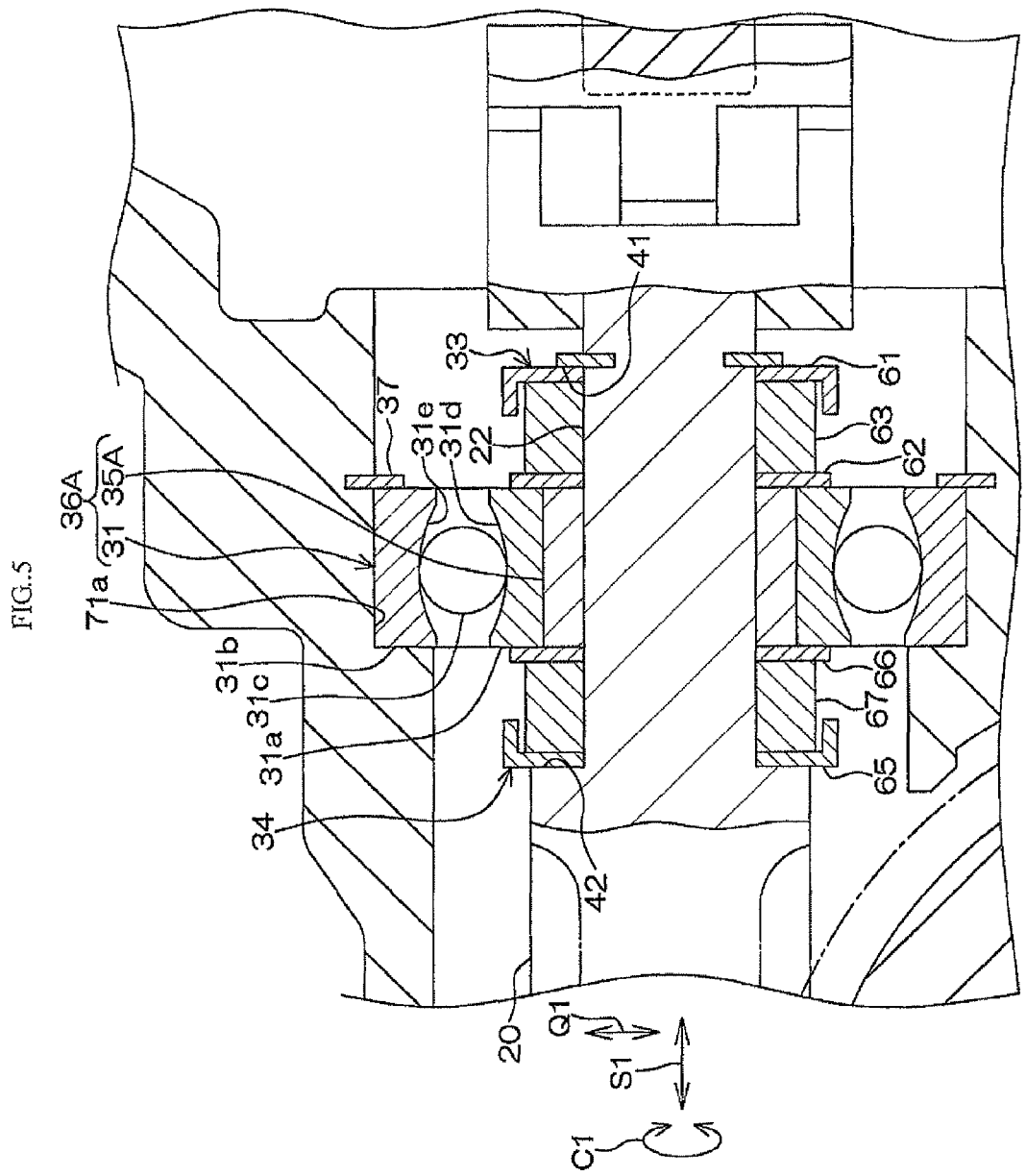
FIG. 5 is a sectional view showing a main part of the structure according to another example embodiment of the invention.

In the meantime, it is to be understood that the invention is not limited to the foregoing example embodiment, but it may be implemented in various other forms and arrangements within the scope of the claims. For example, as shown in FIG. 5, a pressing member 35A may be fitted to the inner ring 31a of the first bearing 31 as described below. In the following, the differences from the example embodiment illustrated in FIGS. 1 to 4 will be mainly described, and the structural elements identical to those in the example embodiment illustrated in FIGS. 1 to 4 will be denoted using the same reference numerals and their descriptions will be omitted.

The pressing member 35A is press-fitted and thereby fixed onto the inner peripheral face of the inner ring 31a of the first bearing 31. The outer diameter of the pressing member 35A (i.e., the diameter measured at the outer peripheral face of the pressing member 35A) is larger than the inner diameter of the inner ring 31a of the first bearing 31 when the pressing member 35A is not fixed on the first bearing 31. Thus, when fixed on the first bearing 31, the pressing member 35A elastically presses the inner ring 31a of the first bearing 31 outward in the radial direction Q1. Thus, in the first bearing 31, the raceway groove 31d of the inner ring 31a, the rolling elements 31c, and the raceway groove 31e of the outer ring 31b are elastically pressed against each other in the radial direction Q1. Thus, the internal clearances in the first bearing 31 are eliminated, more specifically, "negative clearances" are created.

The pressing member 35A is fitted onto the first end portion 22 of the worm shaft 20 through clearance fit, and is movable relative to the worm shaft 20 in the axial direction S1. The inner ring 31a of the first bearing 31 and the pressing member 35A are interposed, in the axial direction S1, between the side plate 62 of the second elastic member unit 33 and the side plate 66 of the second elastic member unit 34. The outer ring 31b of the first bearing 31 is directly fitted to the first bearing support portion 71a through clearance fit.

The pressing member 35A and the first bearing 31 are assembled into a sub-assembly 36A. During assembly of the electric power steering system 1, the first bearing 31 prepared as the sub-assembly 36A is fitted onto the first end portion 22 of the worm shaft 20. Meanwhile, while the second elastic members 63 and 67 are interposed, in the axial direction S1, between the two opposed portions 41 and 42 provided on the worm shaft 20 in the example embodiment illustrated in FIGS. 1 to 4 and the example embodiment illustrated in FIG. 5, it is to be noted that invention is not limited to these structures.

Figure 6:
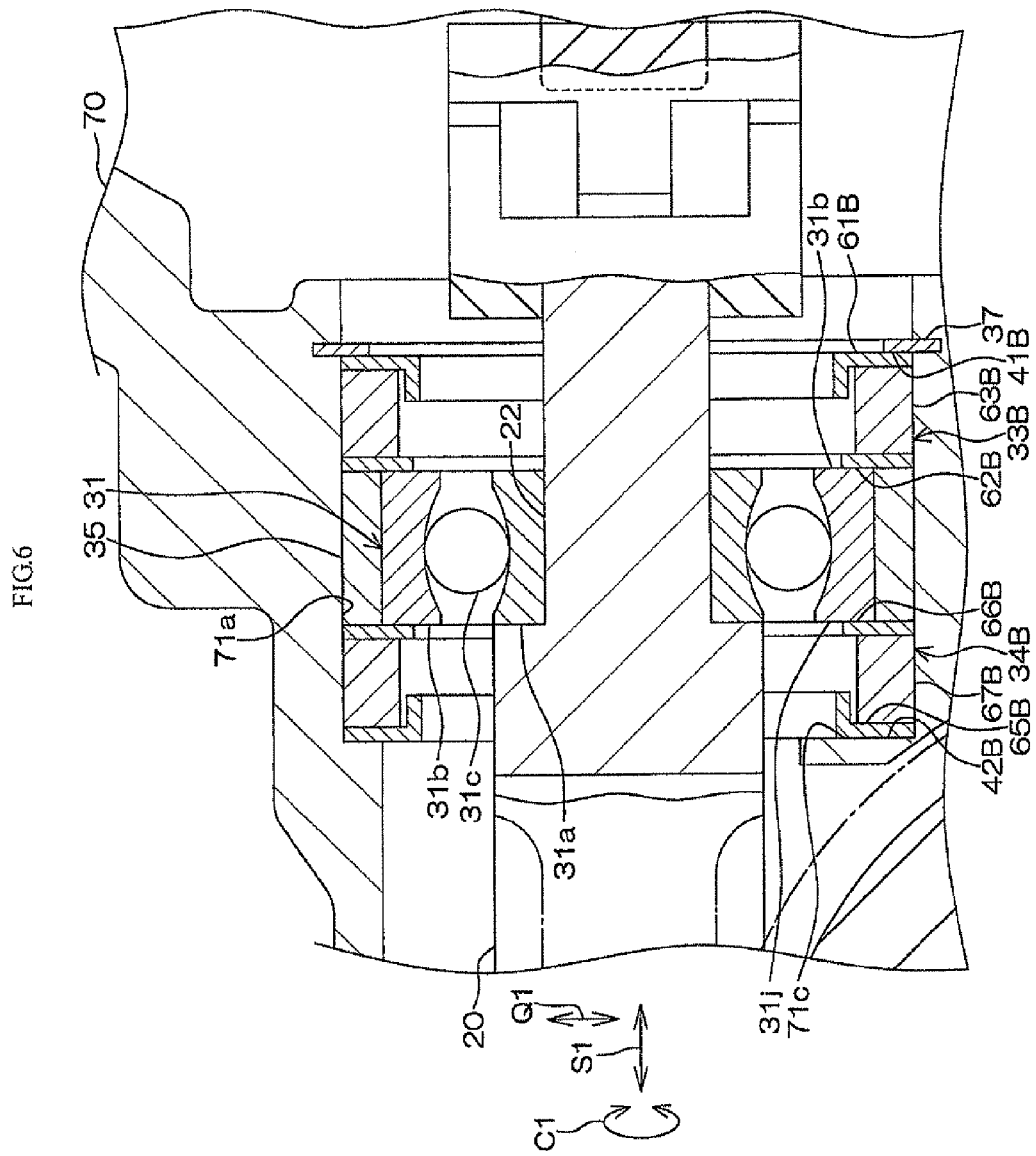
FIG. 6 is a sectional view showing a main part of the structure according to another example embodiment of the invention.

For example, the structure shown in FIG. 6 may alternatively be used. Referring to FIG. 6, second elastic members 63B and 678 are interposed in the axial direction S1 between two opposed portions 41B and 42B provided at the housing 70. The opposed portion 41B is an annular portion provided at one side face of the first snap ring 37, while the opposed portion 42B is an annular portion provided at the annular stepped portion 71c of the drive gear housing portion 71. A second elastic member unit 33B as one of two second elastic member units is arranged between the opposed portion 41B and the outer ring 31b of the first bearing 31, while a side plate 61B as one of two side plates of the second elastic member unit 33B is received by the opposed portion 41B and a side plate 62B is received by a side face 31h, located on one side, of the outer ring 31b of the first bearing 31.

The second elastic member unit 34B is arranged between the opposed portion 42B and the outer ring 31b of the first bearing 31. A side plate 65B as one of two side plates of the second elastic member unit 34B is received by the opposed portion 42B, while a side plate 66b is received by a side face 31j, located on the other side, of the outer ring 31b of the first bearing 31. The outer ring 31b of the first bearing 31 is fitted in the first bearing support portion 71a through clearance fit, and thus is movable relative to the housing 70 in the axial direction S1.

The inner ring 31a of the first bearing 31 is fitted onto the first end portion 22 of the worm shaft 20. Because the inner ring 31a is press-fitted and thereby fixed onto the first end portion 22, the movement of the inner ring 31a relative to the worm shaft 20 in the axial direction S1 is restricted. With this structure, as the worm shaft 20 vibrates (moves) relative to the housing 70 in the axial direction S1, the first bearing 31 concurrently vibrates in the axial direction S1, and the second elastic member units 63B and 67B elastically deform to damp and absorb the vibration.

Figure 7:
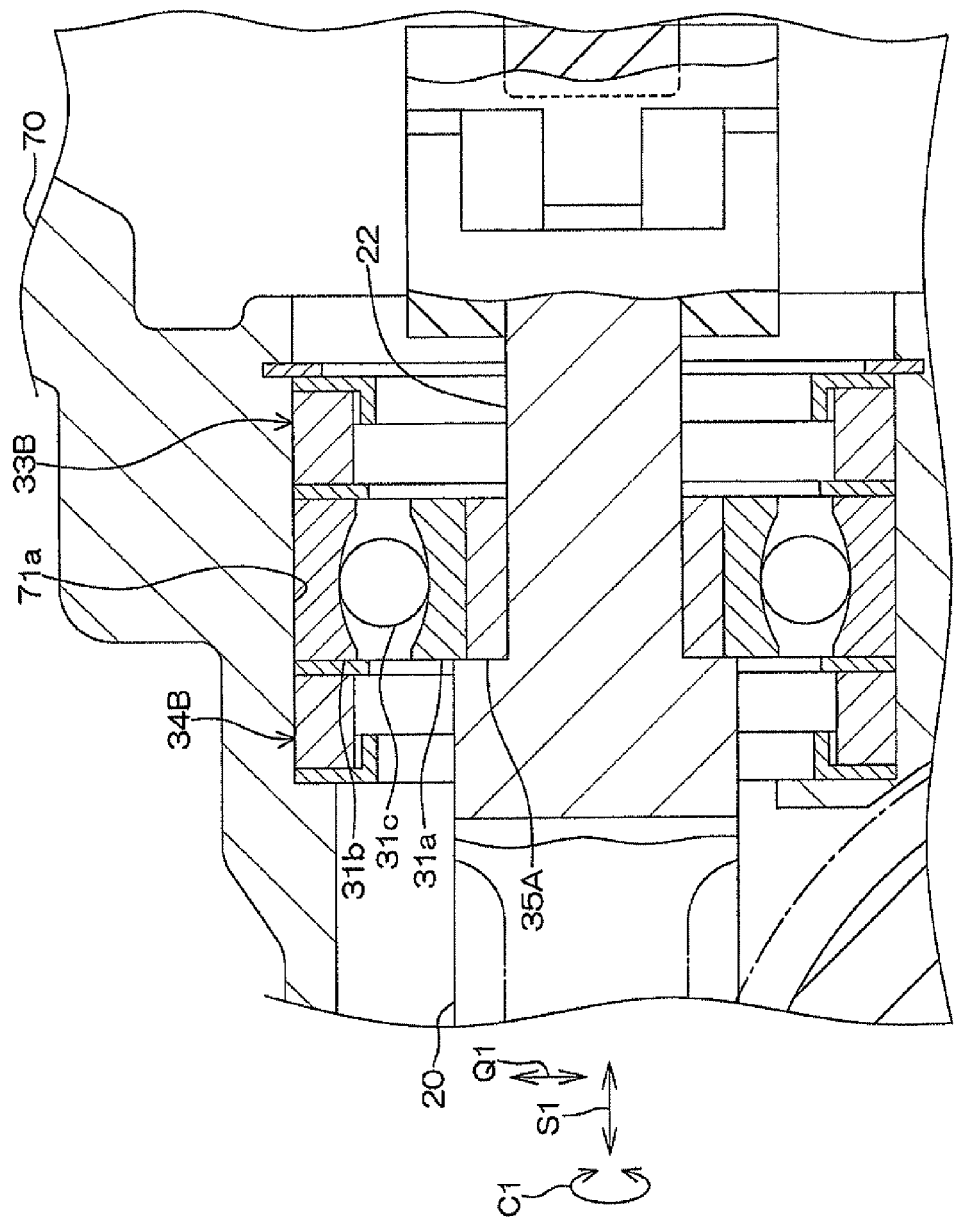
FIG. 7 is a sectional view showing a main part of the structure according to another example embodiment of the invention.

While the pressing member 35 is fixed on the outer ring 31b of the first bearing 31 in the example embodiment illustrated in FIG. 6, the pressing member 35A may be used in place of the pressing member 35 as shown in FIG. 7. In the example embodiment illustrated in FIG. 7, unlike the example embodiment illustrated in FIG. 6, the pressing member 35A is press-fitted and thus fixed at its inner peripheral face onto the first end portion 22 of the worm shaft 20, and is press-fitted and thus fixed at its outer peripheral face to the inner peripheral face of the inner ring 31a of the first bearing 31. The outer ring 31b of the first bearing 31 is fitted in the first bearing support portion 71a through clearance fit, such that the outer ring 31b is supported so as to be movable in the axial direction S1. Other structural features are the same as those in the example embodiment illustrated in FIG. 6.

Further, the second elastic member units 33, 34, 33B, and 34B may be constituted only of the elastic member 63, 67, 63B, or 67B, respectively. In this case, the second elastic members 63 and 67 are each joined to the inner ring 31a of the first bearing 31 and a corresponding one of the two opposed portions 41 and 42 using an adhesive, or the like. The second elastic members 63B and 67B are each joined to the outer ring 31b of the first bearing 31 and a corresponding one of the two opposed portions 41B and 4213 using an adhesive, or the like.

What is claimed is:

1. An electric power steering system, comprising:
a worm shaft that has a first end portion and a second end portion, and that is connected to an electric motor;
a worm wheel that meshes with the worm shaft, and that is connected to a steering mechanism;
a housing that houses the worm shaft and the worm wheel;
a first bearing that rotatably supports the first end portion, and that has an inner ring having a raceway groove, an outer ring having a raceway groove, and rolling elements interposed between the raceway grooves, wherein curvature radii of the raceway grooves in the first bearing are each larger than 50% of a diameter of each of the rolling elements, whereby the worm shaft is allowed to pivot about the first end portion, and the first bearing is opposed, in an axial direction of the worm shaft, to an opposed portion provided at the housing or the worm shaft and is movable relative to the opposed portion in the axial direction;
a second bearing that rotatably supports the second end portion;
a first elastic member that elastically urges the second bearing in a direction in which an inter-axis distance between a central axis of the worm shaft and a central axis of the worm wheel decreases;
an annular pressing member that is fitted on an outer peripheral face of the outer ring and radially presses the first bearing to cause the raceway groove of the inner ring, the raceway groove of the outer ring, and the rolling elements to press against each other; and
a second elastic member that is arranged between the opposed portion and the first bearing and elastically deforms as the worm shaft moves relative to the housing in the axial direction, wherein
the pressing member is comprised of metal,
the pressing member and the first bearing are assembled into a sub-assembly, and
the pressing member is fitted in a retention hole, formed in the housing, through clearance fit.

2. The electric power steering system according to claim 1, wherein:
the first bearing is a ball bearing and the rolling elements are balls; and
the curvature radii of the raceway grooves are curvature radii as measured on a plane on which a central axis of the first bearing extends.

3. The electric power steering system according to claim 2, wherein the curvature radius of the raceway groove of the inner ring is set to 52% to 56% of the diameter of each of the rolling elements.

4. The electric power steering system according to claim 2, wherein the curvature radius of the raceway groove of the outer ring is set to 54% to 58% of the diameter of each of the rolling elements.

5. The electric power steering system according to claim 1, wherein:
the opposed portion includes a pair of opposed portions between which the first bearing is interposed in the axial direction; and
the second elastic member includes a pair of elastic members that are provided, respectively, between one of the opposed portions and the first bearing and between the other of the opposed portions and the first bearing.

6. The electric power steering system according to claim 5, wherein the curvature radius of the raceway groove of the inner ring is set to 52% to 56% of the diameter of each of the rolling elements.

7. The electric power steering system according to claim 5, wherein the curvature radius of the raceway groove of the outer ring is set to 54% to 58% of the diameter of each of the rolling elements.

8. The electric power steering system according to claim 1, wherein the curvature radius of the raceway groove of the inner ring is set to 52% to 56% of the diameter of each of the rolling elements.

9. The electric power steering system according to claim 1, wherein the curvature radius of the raceway groove of the outer ring is set to 54% to 58% of the diameter of each of the rolling elements.

10. The electric power steering system according to claim 1, wherein
when the pressing member is fixed on the outer peripheral face of the outer ring, an inner diameter of the pressing member is smaller than an outer diameter of the outer ring before the pressing member is fitted on the outer peripheral face of the outer ring, or
when the pressing member is fixed on the inner peripheral face of the inner ring, an outer diameter of the pressing member is larger than an inner diameter of the inner ring before the pressing member is fitted on the inner peripheral face of the inner ring.

* * * * *